(12) United States Patent
Lovlekar et al.

(10) Patent No.: US 11,218,924 B2
(45) Date of Patent: Jan. 4, 2022

(54) MOBILITY ENHANCEMENTS FOR CELLULAR COMMUNICATIONS

(71) Applicant: Apple Inc., Cupertino, CA (US)

(72) Inventors: Srirang A. Lovlekar, Cupertino, CA (US); Longda Xing, San Jose, CA (US); Srinivasan Nimmala, San Jose, CA (US); Dawei Zhang, Saratoga, CA (US); Yuqin Chen, Shenzhen (CN); Fangli Xu, Beijing (CN); Haijing Hu, Beijing (CN); Sethuraman Gurumoorthy, San Jose, CA (US); Murtaza A. Shikari, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/479,628

(22) PCT Filed: Aug. 28, 2018

(86) PCT No.: PCT/CN2018/102652
§ 371 (c)(1),
(2) Date: Jul. 22, 2019

(87) PCT Pub. No.: WO2020/041966
PCT Pub. Date: Mar. 5, 2020

(65) Prior Publication Data
US 2020/0404553 A1    Dec. 24, 2020

(51) Int. Cl.
*H04W 36/00*    (2009.01)
*H04W 12/04*    (2009.01)
(Continued)

(52) U.S. Cl.
CPC ... *H04W 36/0069* (2018.08); *H04W 36/0038* (2013.01); *H04W 36/02* (2013.01); *H04W 36/18* (2013.01)

(58) Field of Classification Search
CPC ......... H04W 36/0069; H04W 36/0038; H04W 36/02; H04W 36/18; H04W 12/04;
(Continued)

(56) References Cited

U.S. PATENT DOCUMENTS 10,448,289 B2 * 10/2019  Tenny ............... H04W 36/0038
10,455,456 B2 * 10/2019  Jang .................. H04W 72/1242
(Continued)

FOREIGN PATENT DOCUMENTS

CN     101472277 A    7/2009
CN     104349312 A    2/2015
(Continued)

OTHER PUBLICATIONS

Huawei, Hisilicon; "DC bases NR scheme for 0ms interruption handover", 3GPP TSG-RAN WG2 #101 R2-1802473 Revision of R2-1800550, Athens, Greece. Mar. 2, 2018. 7 Pages.
(Continued)

*Primary Examiner* — Ahmed Elallam
(74) *Attorney, Agent, or Firm* — Kowert, Hood, Munyon, Rankin & Goetzel, P.C.

(57) ABSTRACT

Techniques are disclosed relating to handover between cellular base stations. In some embodiments that use dual-connectivity handover, disclosed techniques may facilitate synchronization of a security configuration switch. In some embodiments, the base station and/or mobile device determine activation sequence numbers for the security configuration switch (e.g., by estimating when a path switch will occur). In some embodiments, the security configuration switch is implicitly detected based in deciphering failure. In some embodiments, the security configuration switch is explicitly signaled and is checked based on deciphering
(Continued)

failure. In some embodiments that use make before break handover techniques, a source base station may be retained after the path switch.

26 Claims, 17 Drawing Sheets

(51) Int. Cl.
*H04W 36/02* (2009.01)
*H04W 40/36* (2009.01)
*H04W 36/18* (2009.01)

(58) Field of Classification Search
CPC ........... H04W 56/002; H04W 12/1006; H04W 36/0027; H04W 36/30; H04W 56/001; H04W 76/34; H04W 12/037; H04W 12/10; H04W 12/37; H04W 40/36; H04L 63/205
See application file for complete search history.

(56) References Cited

U.S. PATENT DOCUMENTS

| | | | | |
|---|---|---|---|---|
| 10,667,192 | B1* | 5/2020 | Paladugu | H04W 36/18 |
| 10,687,263 | B2* | 6/2020 | Paladugu | H04W 76/27 |
| 10,750,414 | B2* | 8/2020 | Tenny | H04W 36/0027 |
| 10,893,568 | B2* | 1/2021 | Gage | H04L 9/0844 |
| 11,108,755 | B2* | 8/2021 | Sharma | H04W 12/041 |
| 2014/0241317 | A1 | 8/2014 | Jamadagni et al. | |
| 2016/0373975 | A1 | 12/2016 | Xu et al. | |
| 2017/0215225 | A1 | 7/2017 | Yi et al. | |
| 2018/0324651 | A1* | 11/2018 | Tenny | H04W 36/0027 |
| 2019/0261177 | A1* | 8/2019 | Ali | H04W 36/0061 |
| 2019/0313298 | A1* | 10/2019 | Rico Alvarino | H04W 36/0069 |
| 2019/0357097 | A1* | 11/2019 | Rugeland | H04W 12/0401 |
| 2020/0008113 | A1* | 1/2020 | Chen | H04W 36/18 |
| 2020/0022032 | A1* | 1/2020 | Tenny | H04W 36/0033 |
| 2020/0022043 | A1* | 1/2020 | Pelletier | H04W 36/0085 |
| 2020/0053600 | A1* | 2/2020 | Jang | H04W 28/26 |
| 2020/0053610 | A1* | 2/2020 | Lyu | H04W 36/0069 |
| 2020/0107189 | A1* | 4/2020 | Sharma | H04W 36/0038 |
| 2020/0137639 | A1* | 4/2020 | Yuan | H04W 76/30 |
| 2020/0154331 | A1* | 5/2020 | Yang | H04W 36/00 |
| 2020/0163140 | A1* | 5/2020 | Mochizuki | H04W 36/0069 |
| 2020/0344657 | A1* | 10/2020 | Paladugu | H04W 36/08 |

FOREIGN PATENT DOCUMENTS

| | | | |
|---|---|---|---|
| CN | 105491635 | A | 4/2016 |
| CN | 107027118 | A | 8/2017 |
| EP | 3247141 | A1 | 11/2017 |
| WO | WO 2011/063290 | A1 | 5/2011 |
| WO | WO 2014/050805 | A1 | 4/2014 |
| WO | 2015017968 | A1 | 2/2015 |
| WO | WO-2020000260 | A1 * | 1/2020 |
| WO | WO-2020013988 | A1 * | 1/2020 |
| WO | WO-2020030278 | A1 * | 2/2020 |

OTHER PUBLICATIONS

Qualcomm Incorporated; "NR 0ms Interruption HO", 3GPP TSG-RAN WG2 Meeting #101 R2-1803662, Athens, Greece. Mar. 2, 2018. 8 Pages.
Huawei, HiSilicon, "Security Key Change Without L2 Reset" #GPP TSG RAN WG2 Adhoc NR R2-1706713; Jun. 17, 2017 5 pages.
Huawei, HiSilicon "OMS Mobility Interruption in Nr" 3GPP TSG RAN WG2#96 R2-168564, Nov. 5, 2016, 8 pages.
First Examination Report for Application No. IN 201917032609, dated Jan. 29, 2021, 6 pages.
Extended European Search Report for EP 18904494.1218, dated Feb. 15, 2021,9 pages.
Broadcom Corporation "Method to sue SCG during MCG handover for Dual Connectivity" 3GPP TSG-RAN WG2 Meeting #85 R2-140530, Feb. 10, 2014, Prague, Czech Republic, 8 pages.
Broadcom Corporation "MCG handover for Dual Connectivity" 3GPP TSG-RAN WG2 Meeting #85 R2-140531, Feb. 10, 2014, Prague, Czech Republic, 8 pages.
First Office Action for Chinese Patent Application No. 201880014427. 3, Jul. 5, 2021.
Nokia et al., "Dual connected intra-frequency handover for 0 msinterruption and mobility robustness", 3GPP TSGRAN WG2 Meeting #101 R2-1803345, Athens, Greece, Feb. 26-Mar. 2, 2018.

\* cited by examiner

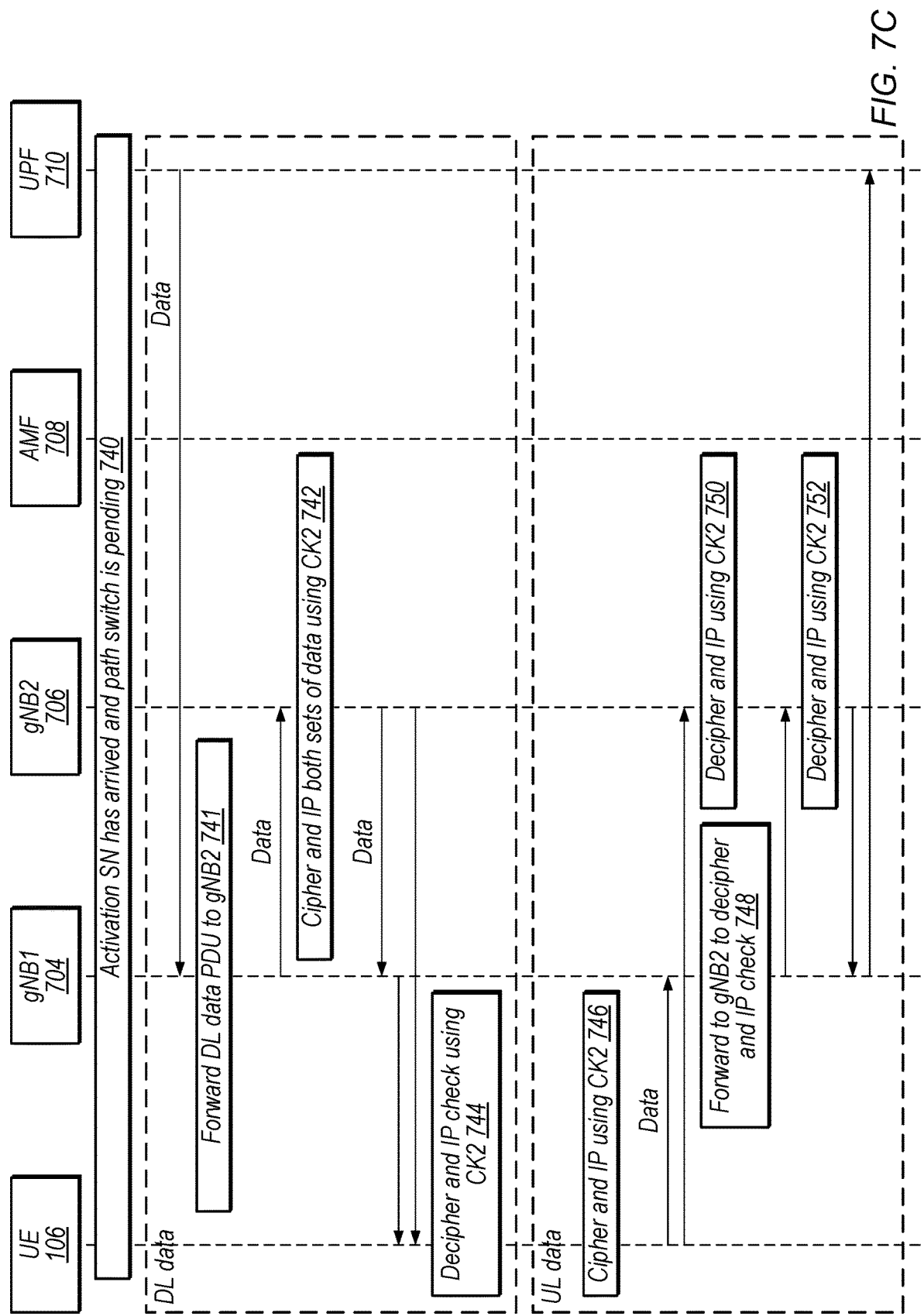

MOBILITY ENHANCEMENTS FOR CELLULAR COMMUNICATIONS

FIELD

The present application relates to cellular wireless communication devices, and more particularly to techniques for tracking security configurations during handover.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards.

Conventional LTE handover procedures (e.g., from one base station to another) are prone to handover failures and may introduce latency of tens of milliseconds for user plane data. Latency may be due to RF retuning, DL and UL synchronization on the target cell, and L2 reset, for example.

In some implementations a device may have dual connectivity to base stations of the same radio access network or multiple different radio access networks, e.g., an LTE network and a NR network, different LTE networks, different NR networks, different base stations of the same NR network, etc.

BRIEF DESCRIPTION OF THE DRAWINGS

A better understanding of the present subject matter can be obtained when the following detailed description of various embodiments is considered in conjunction with the following drawings, in which:

FIGS. 7A-7E are communication diagrams illustrating exemplary handover techniques using determined activation sequence numbers, according to some embodiments.

Figure 1:
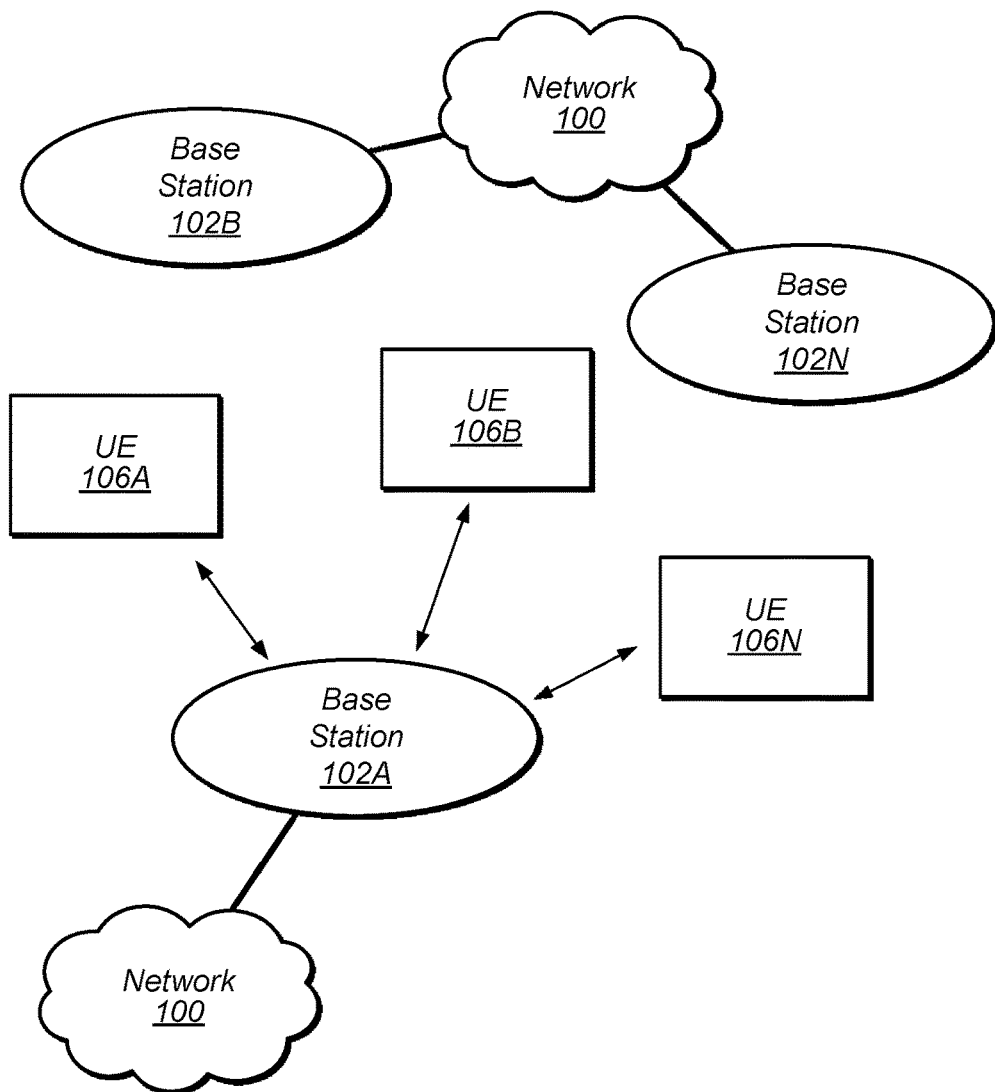
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "application processor configured to send an IP packet" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Figure 2:
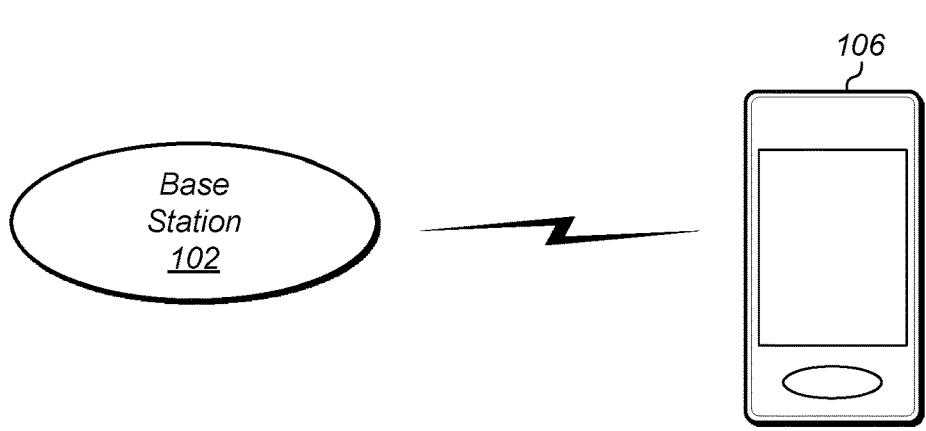
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
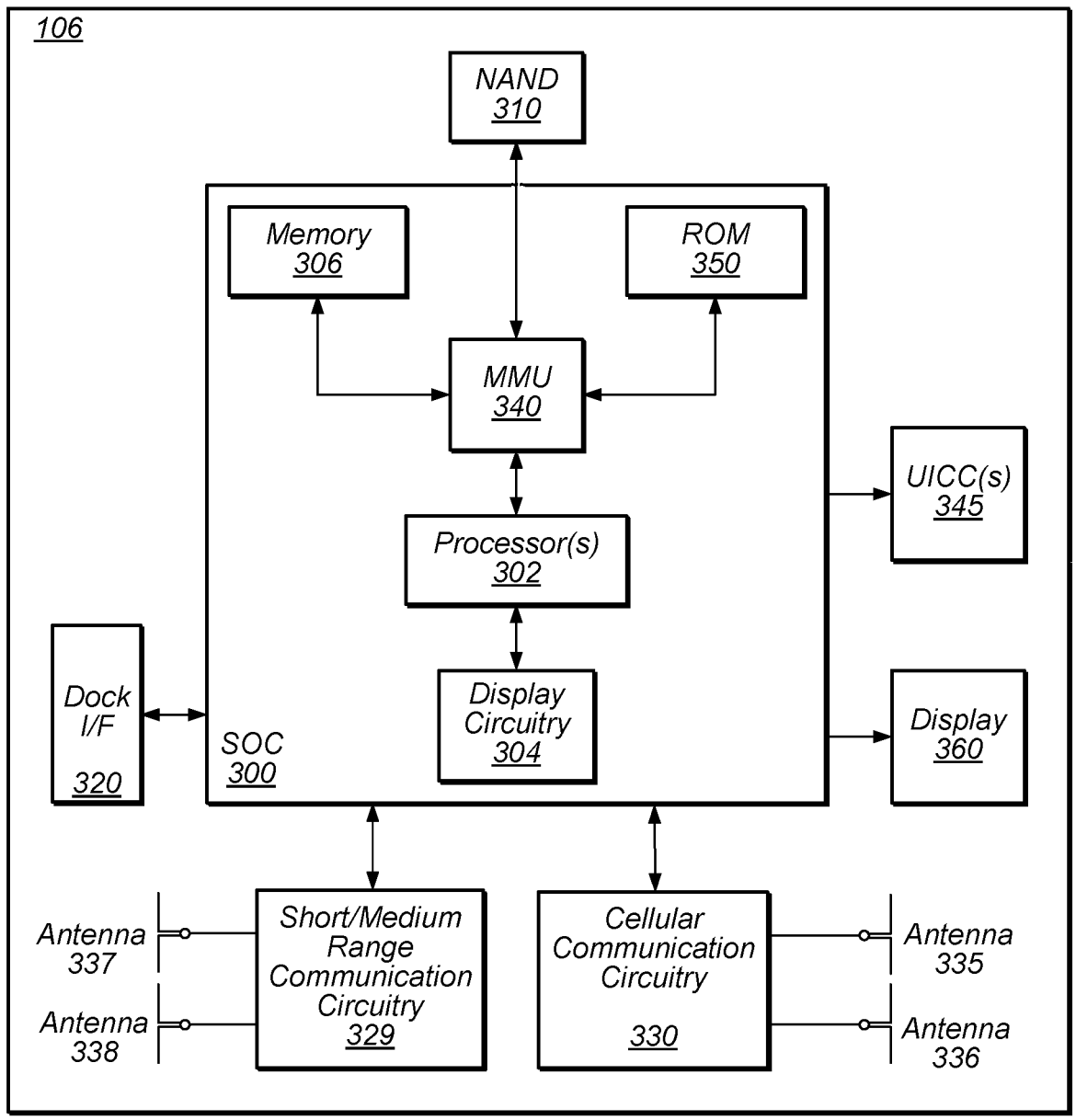
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector OF 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector OF 320, and/or display 360. The MMU 340 may be configured to perform memory protection and page table translation or set up. In some embodiments, the MMU 340 may be included as a portion of the processor(s) 302.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
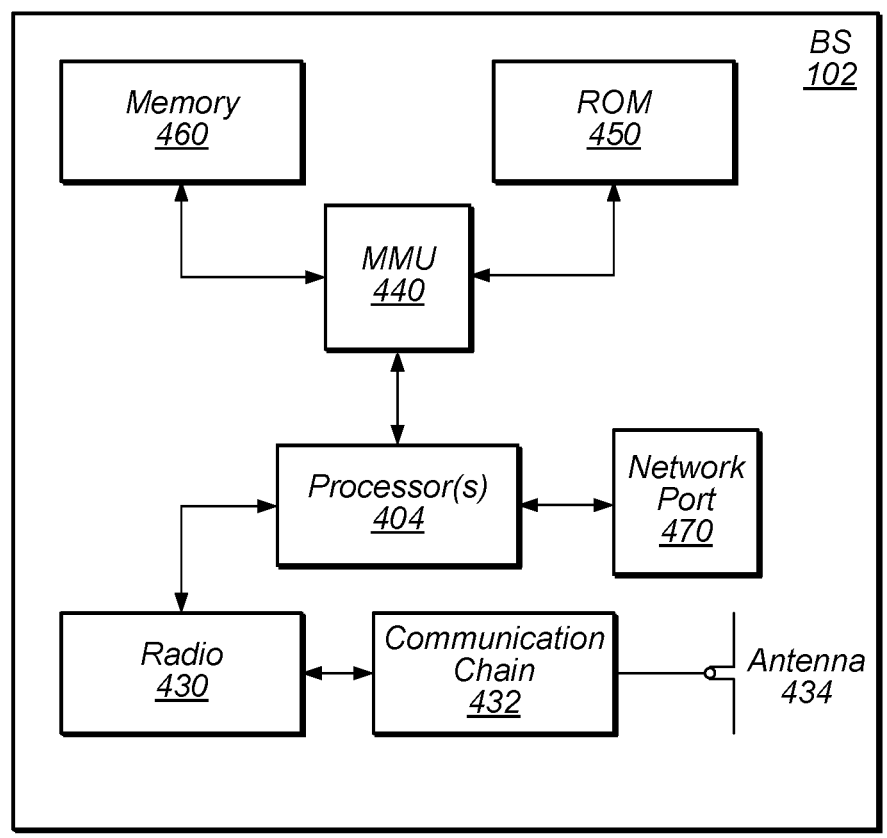
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Overview of Exemplary Mobility Enhancements for Handovers

As discussed above, current handover procedures in LTE introduce latency and may be prone to handover failures. Various techniques discussed below may reduce handover failures and latency, in various communications standards. Handover failures may be caused by various situations, including rapidly deteriorating serving cell conditions that prevent a UE from receiving a handover command. Latency may be caused by RF retuning (e.g., to a frequency used for the target cell), DL synchronization in the target cell, L2 reset, and/or UL synchronization in the target cell (e.g., using a RACH procedure).

Speaking generally, various techniques may be used to avoid handover failure and reduce latency. For example, RACH-less handovers may reduce the time needed for UL synchronization in the target cell. Make before break (MBB) techniques may reduce the time needed for RF retuning and DL/UL synchronization, e.g., using UEs with multiple RF chains to set up a connection to the target cell before breaking with the source cell. Similarly, dual-connectivity (DC) techniques may be used to connect to both the source cell and target cell before handover. Finally, MBB techniques may be used for redundancy for the handover to reduce data loss.

Figure 9:
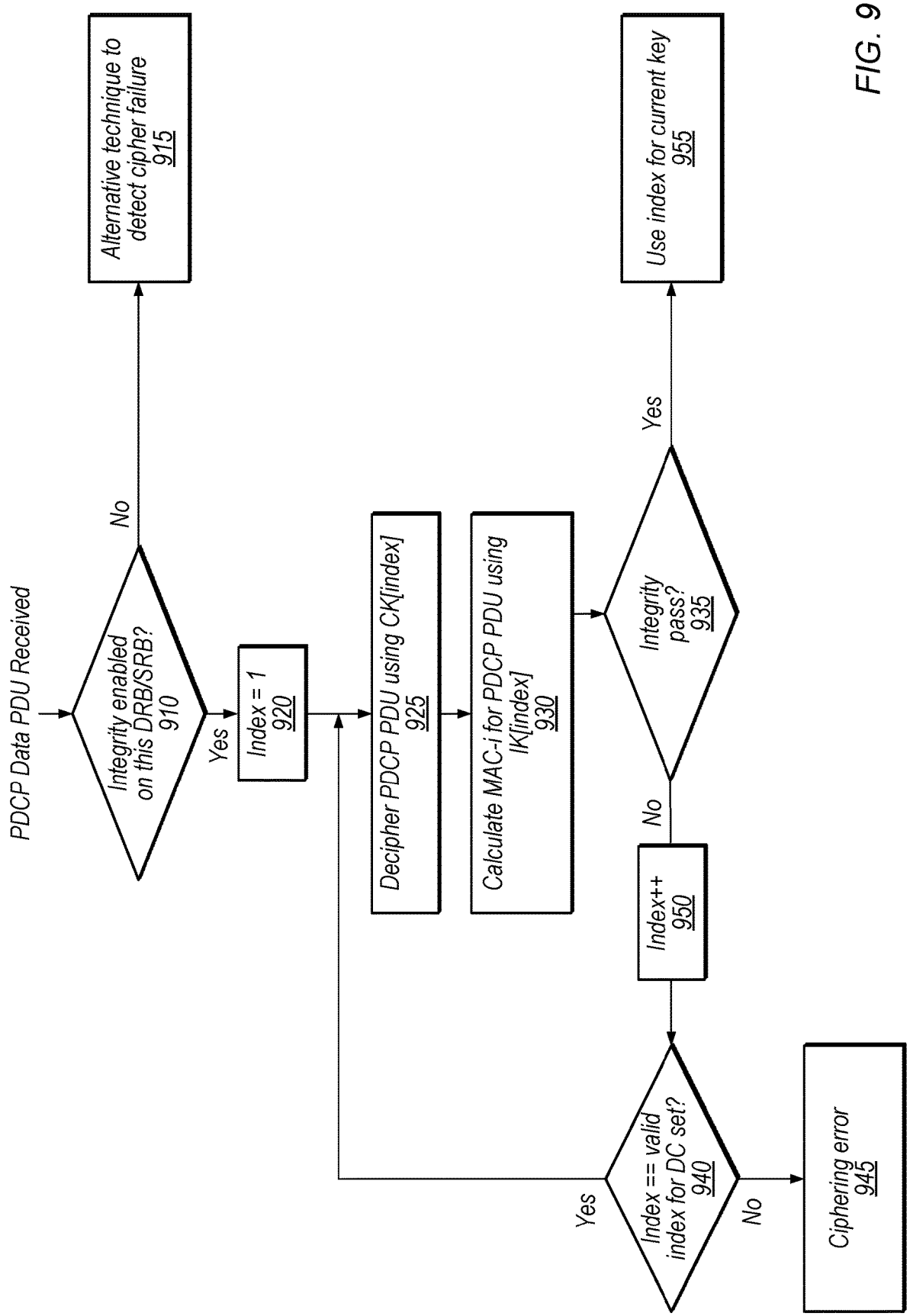
FIG. 9 is a flow diagram illustrating an exemplary technique for implicitly detecting a security configuration switch, according to some embodiments.
Figure 10A:
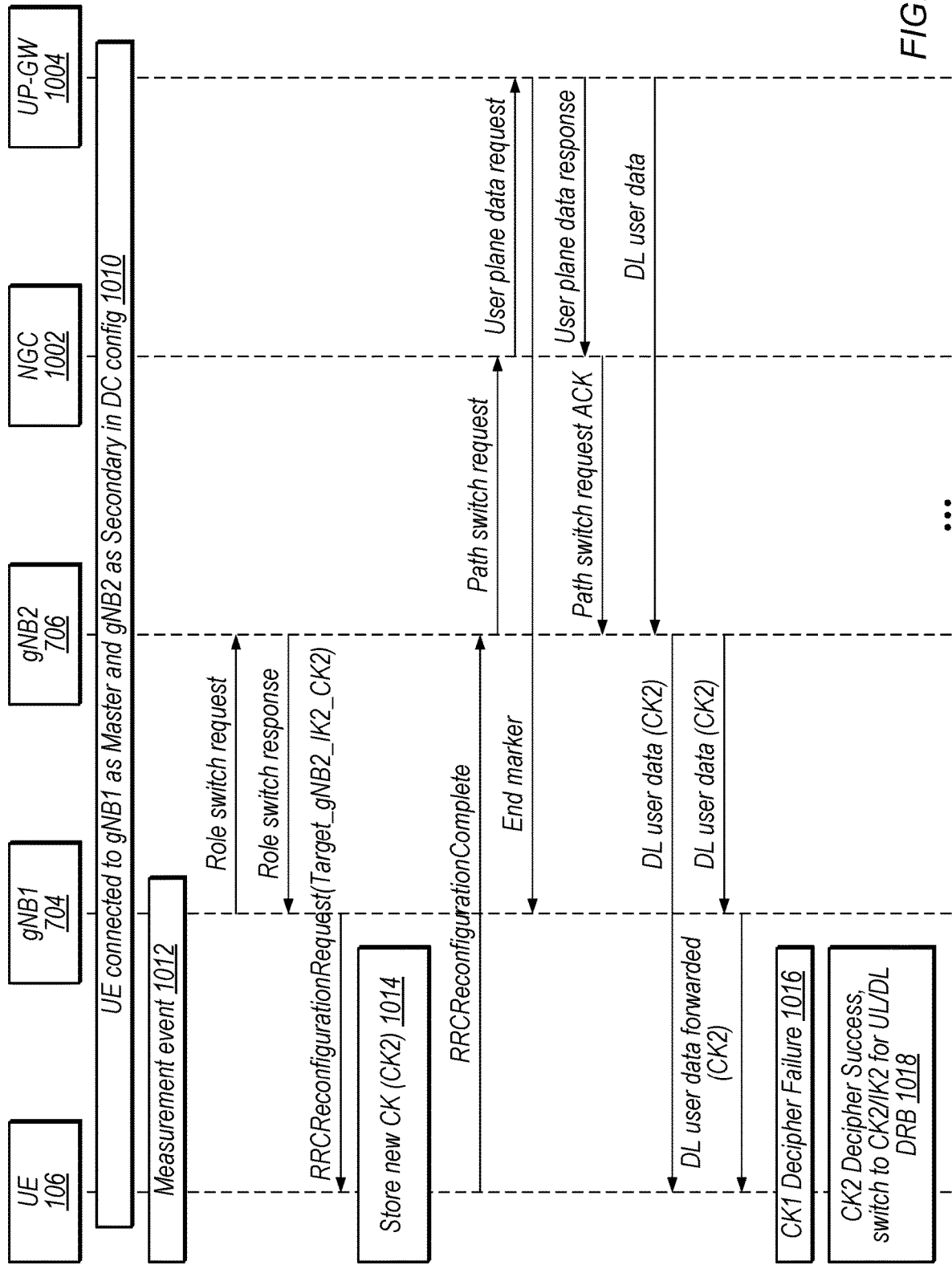
FIGS. 10A-10B are communication diagrams illustrating implicit detection of a security configuration switch, according to some embodiments.
Figure 10B:
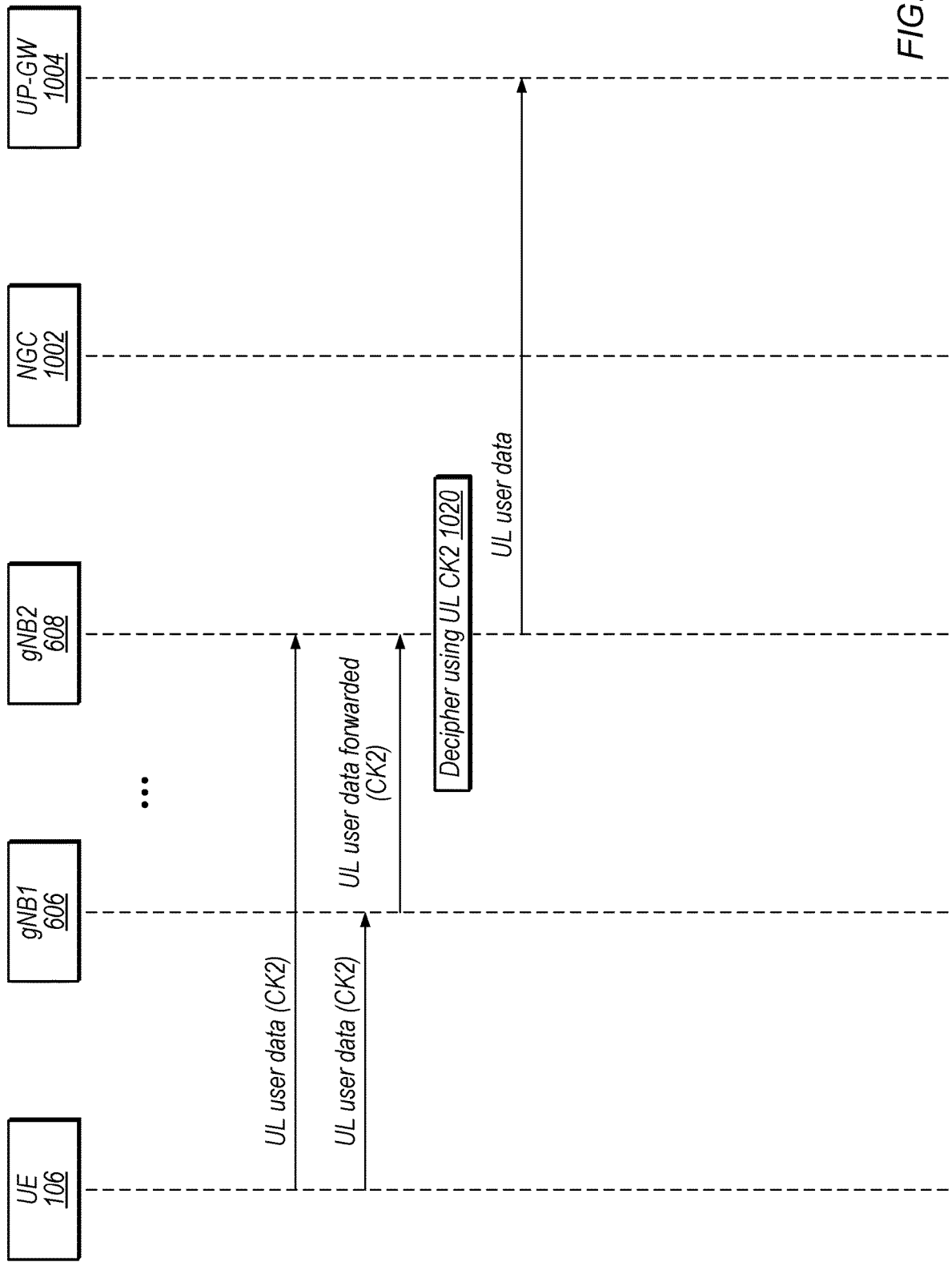
Figure 11A:
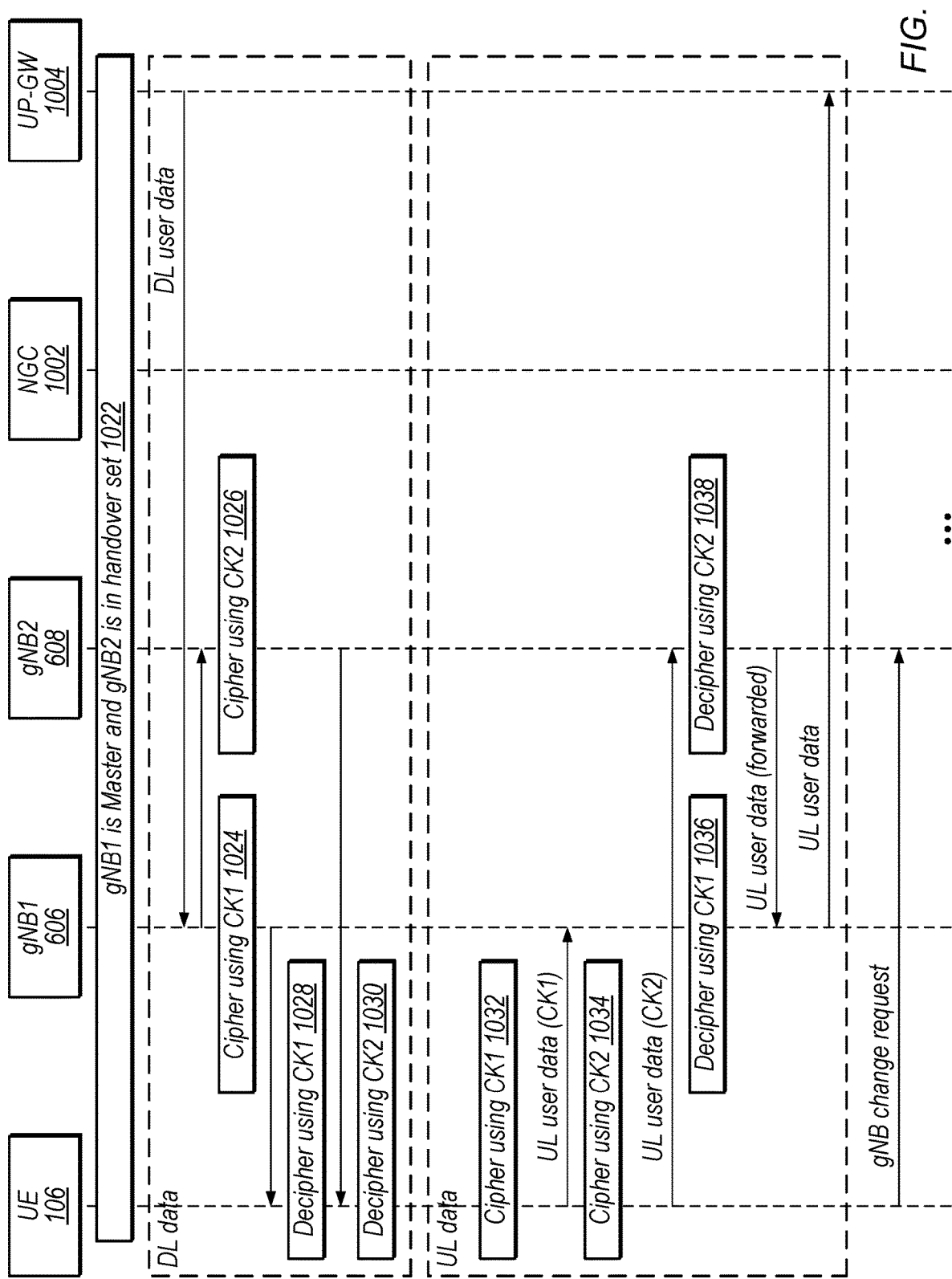
FIGS. 11A-11C are communication diagrams illustrating exemplary make-before-break handover techniques, according to some embodiments.
Figure 11B:
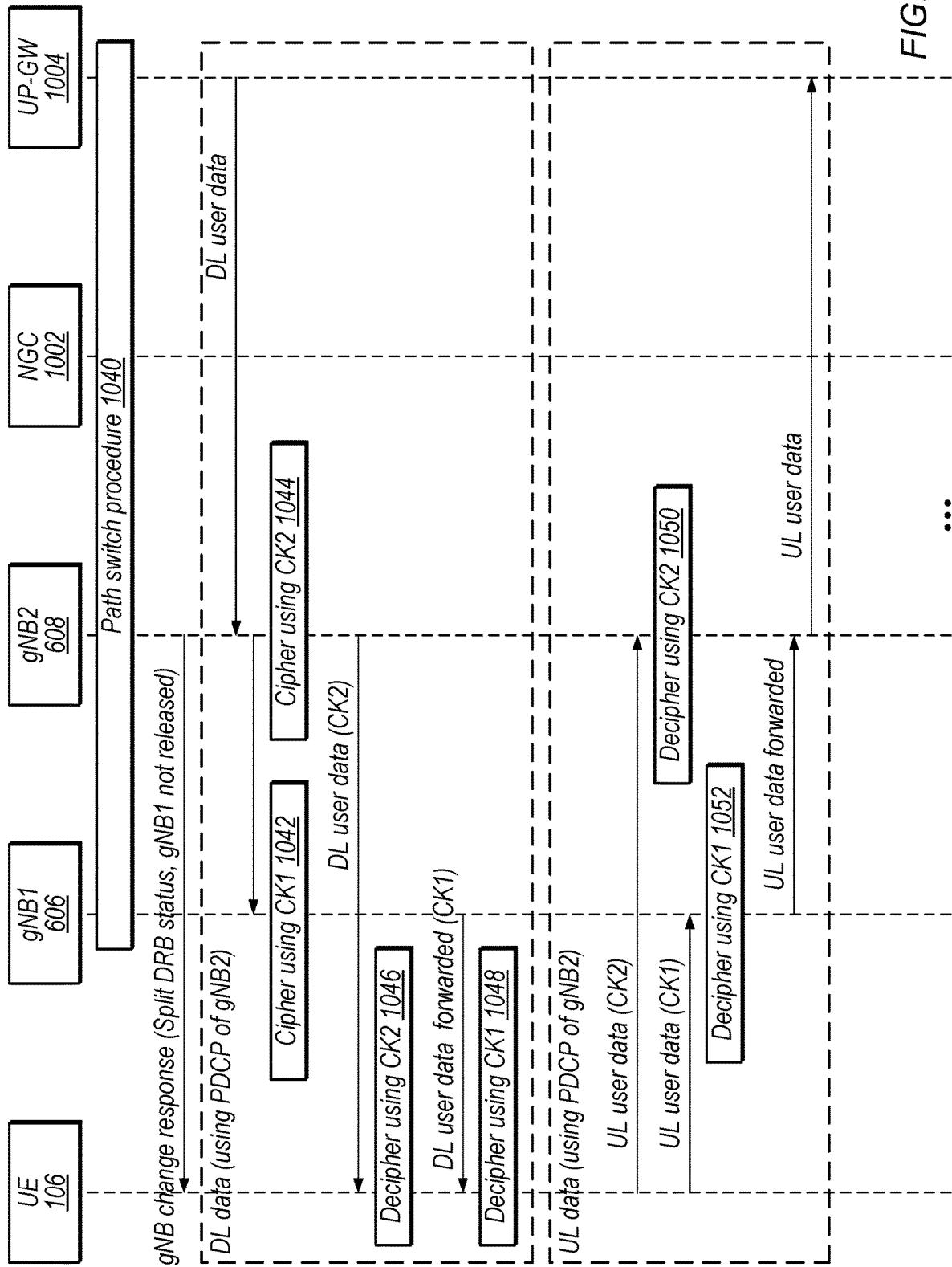
Figure 11C:
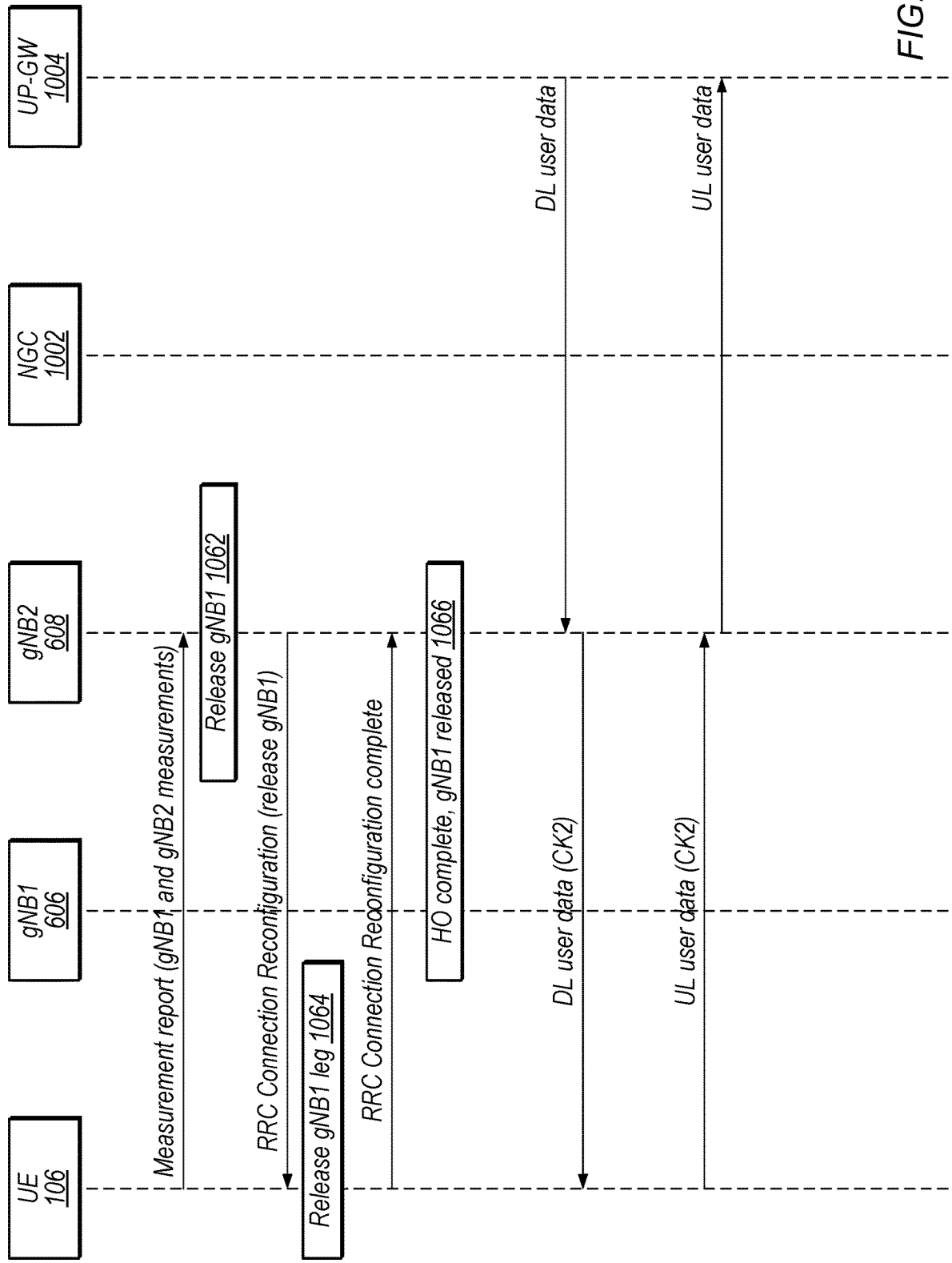

The present disclosures presents techniques relating to DC-based mobility with reference to FIGS. 7A-10B and techniques relating to MBB handovers with reference to FIGS. 11A-11C.

Overview of DC-Based Handover and Security Configuration

Figure 5:
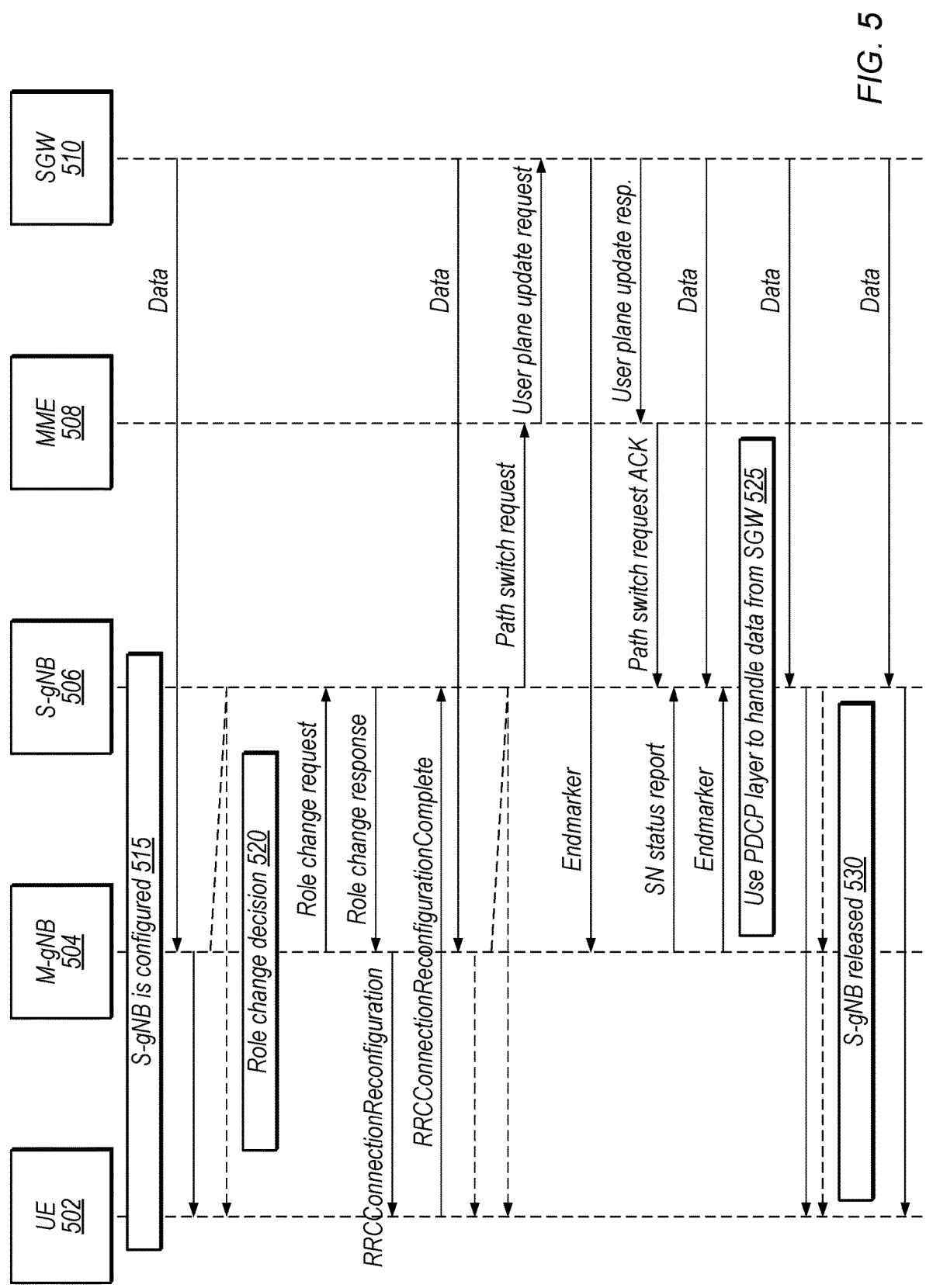
FIG. 5 illustrates an example multi-connectivity handover procedure, according to some embodiments.

FIG. 5 is a communications diagram illustrating an exemplary DC-based handover procedure, according to some embodiments. In the illustrated embodiment, communications are performed between ones of UE 502, master gNB (M-gNB) 504, secondary gNB (S-gNB) 506, mobility management entity (MME) 508, and serving gateway (SGW) 510. Note that, in some embodiments, communications between base stations and a UE are performed wirelessly while communications between base stations may be performed using an Xn link, for example.

At 515, in the illustrated embodiment, the S-gNB is configured to begin dual connectivity. For example, UE 502 and M-gNB may communicate prior to 515 using single connectivity. After configuration of S-gNB 506, in the illustrated embodiment, DL data from SGW 510 arrives at M-gNB 504 from SGW 510. M-gNB sends the data to UE 502 and also forwards the data to S-gNB, which sends all or a portion of the data to UE 502 via a diverse transmission. This may reduce data loss, for example, by communicating data via multiple base stations.

At 520, in the illustrated embodiment, M-gNB 504 makes a role change decision, e.g., based on a measurement report indicating that conditions are deteriorating. This role change decision may start the handover process, which results in S-gNB 506 becoming the master gNB and potentially releasing gNB 504 to complete the handover. M-gNB 504 sends a role change request to S-gNB 506 and receives a role change response. M-gNB 506 then sends an RRCConnectionReconfiguration message to UE 502 and receives an RRCConnectionReconfigurationComplete message. As shown, even after the RRC connection reconfiguration, data may be sent to M-gNB and forwarded.

Subsequently, S-gNB 506 sends a path switch request to the MME 508, which responsively sends a user plane update request to the serving gateway SGW 510. The serving gateway then sends an end marker indicating when the path switch will occur (e.g., using a sequence number (SN)). After a user plane update response and path switch request acknowledgment (ACK), the gNB 504 sends an SN status report and the end marker to gNB 506. The gNB 506 then begins to use its own PDCP layer to handle data from the SGW, at 525. As shown, after the path switch, SGW 510 is configured to send DL data to gNB 506, which sends the data to UE 502 and also forwards the data to gNB 504 for diverse transmission to UE 502 (note that various forwarded data discussed herein may or may not be duplicated when sent to the UE 502 via a diverse path).

At 530, in the illustrated embodiment, gNB 504 (which is now the secondary gNB) is released and the handover is complete. Subsequently, because dual-connectivity has ended, DL data is simply sent to UE 502 via gNB 506.

Figure 6:
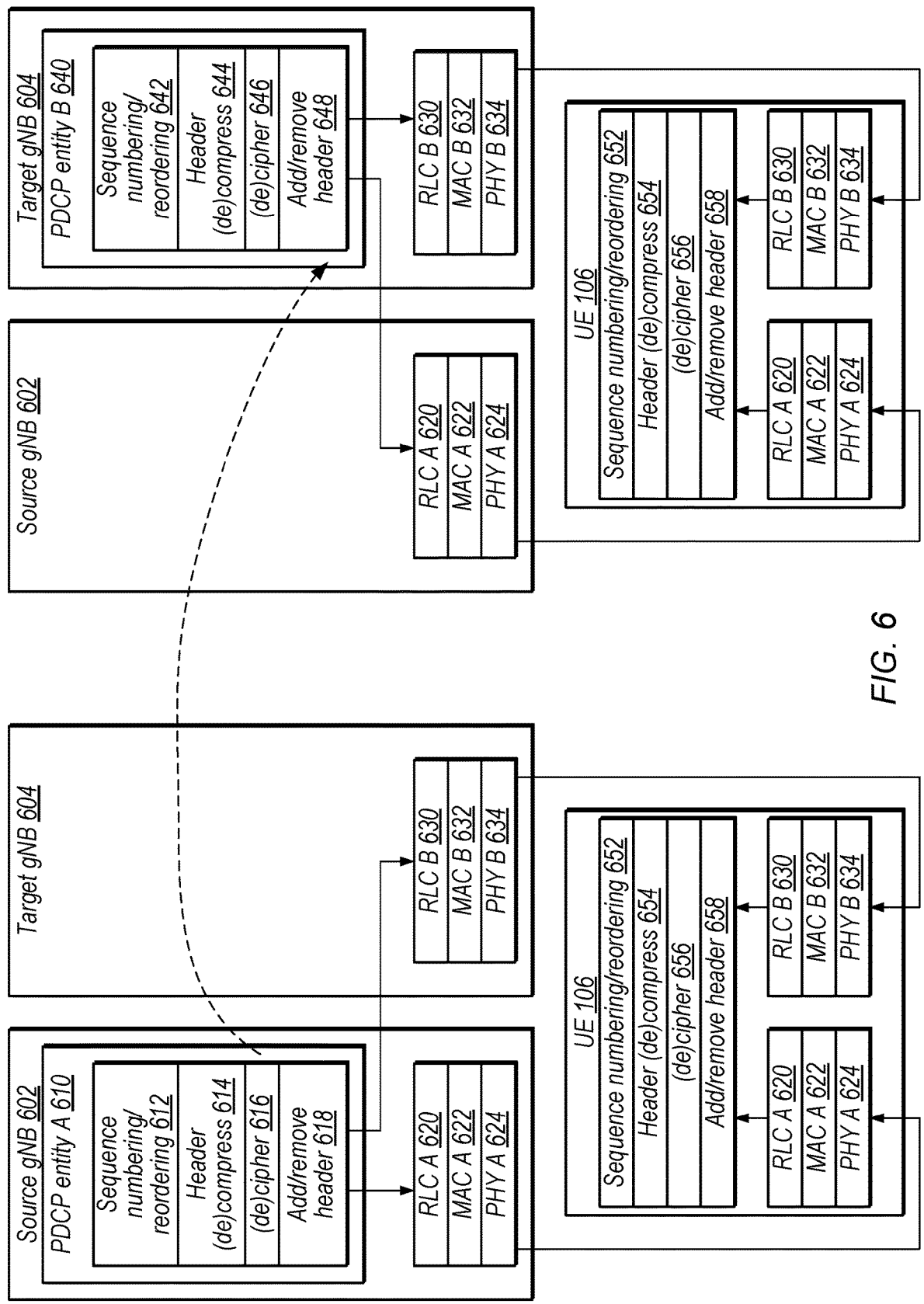
FIG. 6 is a block diagram illustrating PDCP relocation, according to some embodiments.

FIG. 6 is a block diagram illustrating an exemplary PDCP relocation corresponding to a path switch, according to some embodiments. In the illustrated example, the left-hand portion of the illustration represents the configuration before the path switch and the right-hand portion of the illustration represents the configuration after the path switch. Speaking generally, DC communications use the PDCP entity of the source gNB prior to the path switch and the PDCP entity of the target gNB after the path switch.

In the illustrated embodiment, source gNB 602 implements a PDCP entity A 610, an RLC layer A 620, a MAC layer A 622, and a PHY layer A 624. In the illustrated embodiment, target gNB 604 implements a PDCP entity B 640, an RLC layer B 630, a MAC layer B 632, and a PHY layer B 634. In the illustrated embodiment, UE 106 also implements PDCP modules, 652, 654, 656, and 658 along with separate RLC, MAC, and PHY layers A and B for each gNB (elements 620, 622, 624, 630, 632, and 634).

In the illustrated embodiment, each PDCP entity implements a module for sequence numbering and reordering 612/642, a module for header compression and decompression 614/644, a module for ciphering and deciphering 616/646, and a module for adding and removing headers 618/648.

Speaking generally, each gNB's PDCP entity may have a different security configuration (e.g., different cipher keys (CKs) and integrity keys (IK)). At the time of the role change when the master gNB becomes the secondary gNB, the cipher key of the new master gNB is used when it becomes the anchor of the split data radio bearer (DRB) for DC communications.

In some embodiments, this switch may present challenges for the UE 106. For example, the UE may need to know that the network has switched from CK1 (the cipher key of the source eNB) to CK2 (the cipher key of the target gNB) in order to be in synchronization with the network.

In some embodiments, an activation time is determined and communicated and used to determine when to switch security configurations. These embodiments are discussed in detail with reference to FIGS. 7A-7E. In some embodiments, switches are automatically detected based on ciphering failures. These embodiments are discussed in detail below with reference to FIGS. 8-10B. In some embodiments, switches are signaled explicitly and disclosed techniques verify the signaling (e.g., to reduce or avoid denial of service attacks).

In various embodiments, techniques described with reference to NR technology may be applied to other communications standards, such as LTE for example, and vice versa. Further, the various techniques discussed herein may be used independently or may be combined (e.g., in different operating modes of a given device or even in the same operating mode). Further, various techniques discussed with reference to dual connectivity may be applied to multi-connectivity with any appropriate number of base stations. Thus, references to dual connectivity are not intended to limit the disclosed techniques to two base stations or two cells. Similarly, various discussions of security configuration switches refer to cipher keys and integrity keys, for example. These key types are included for purposes of illustration but are not intended to limit the types of information specified by a security configuration, in other embodiments.

Exemplary Activation-Time-Based Synchronization of Security Configuration

FIGS. 7A-7E are communications diagrams illustrating exemplary activation-time-based synchronization of a security configuration switch, according to some embodiments. In the illustrated example, communications are shown between ones of UE 106, gNB1 704, gNB 2 706, access and mobility management function (AMF) 708, and user plane function (UPF) 710.

Figure 7A:
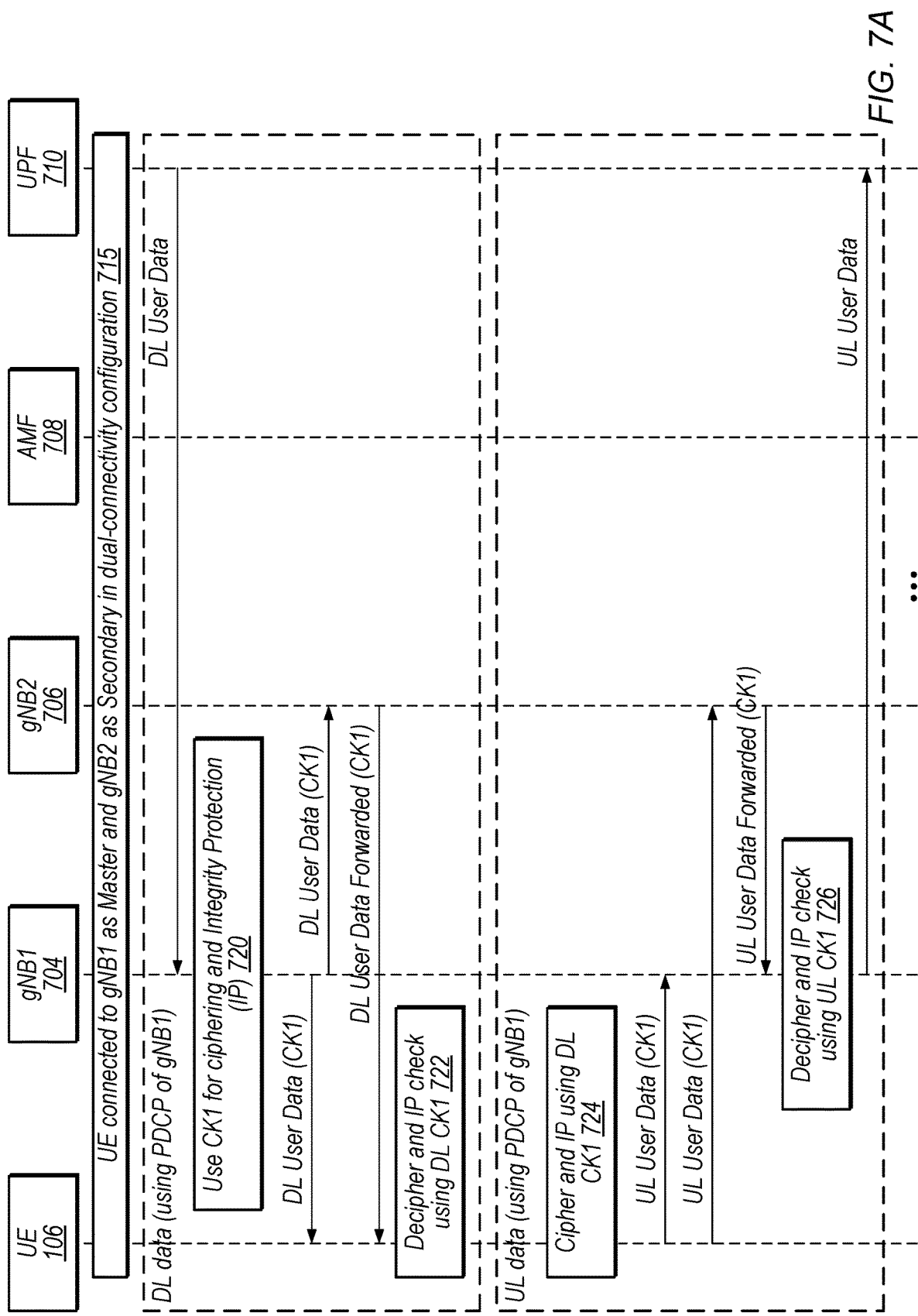
Figure 7B:
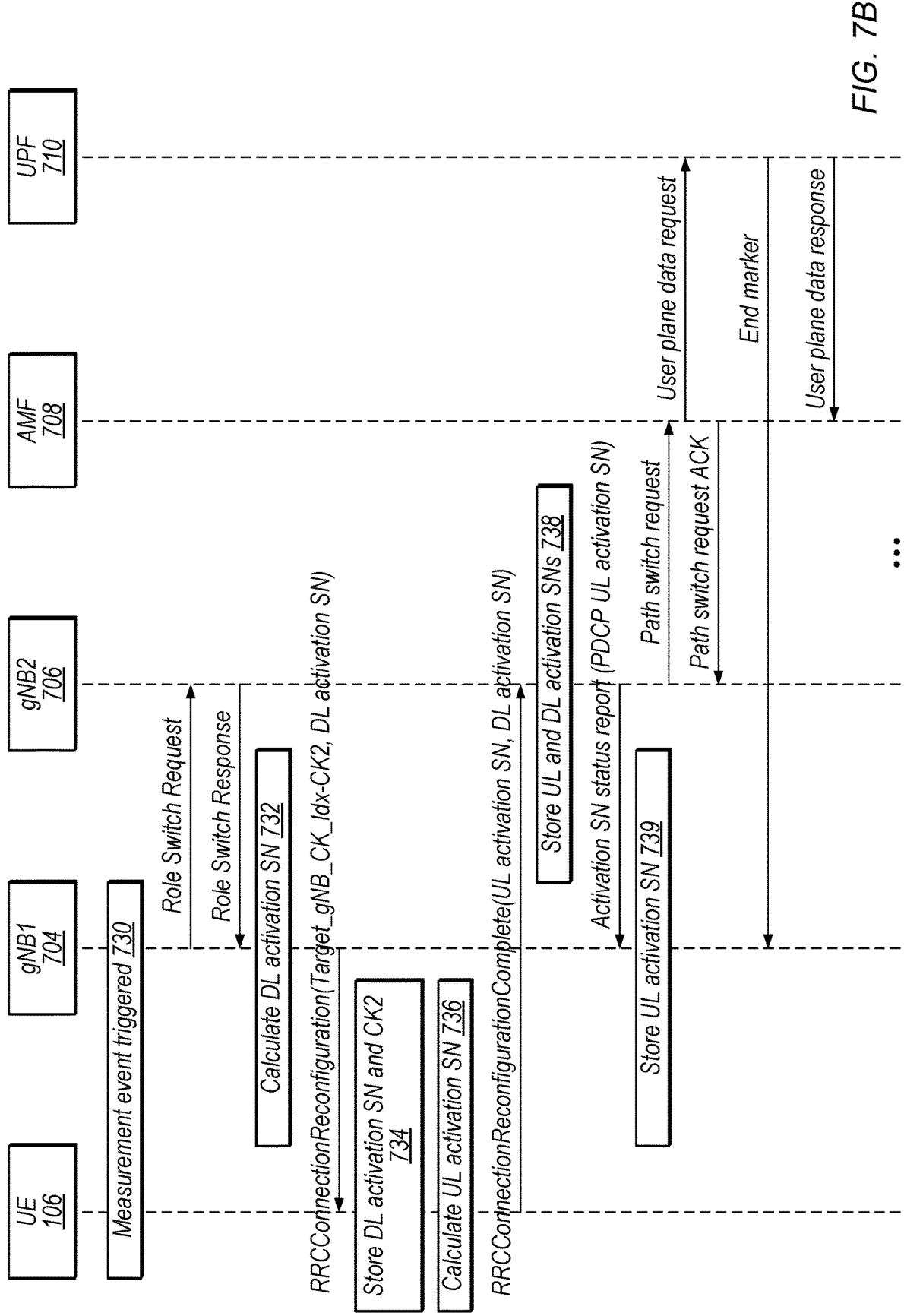
Figure 7D:
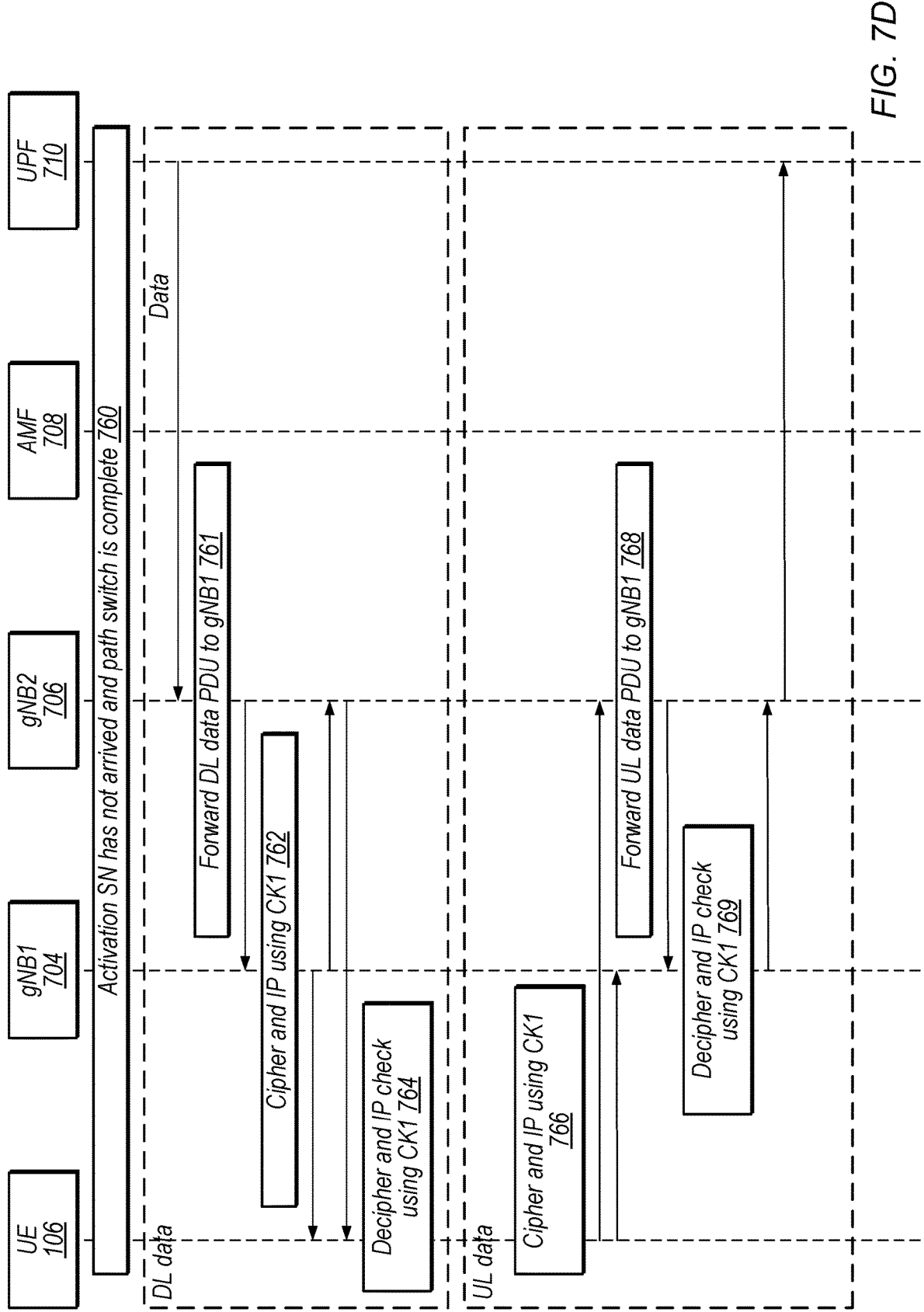
Figure 7E:
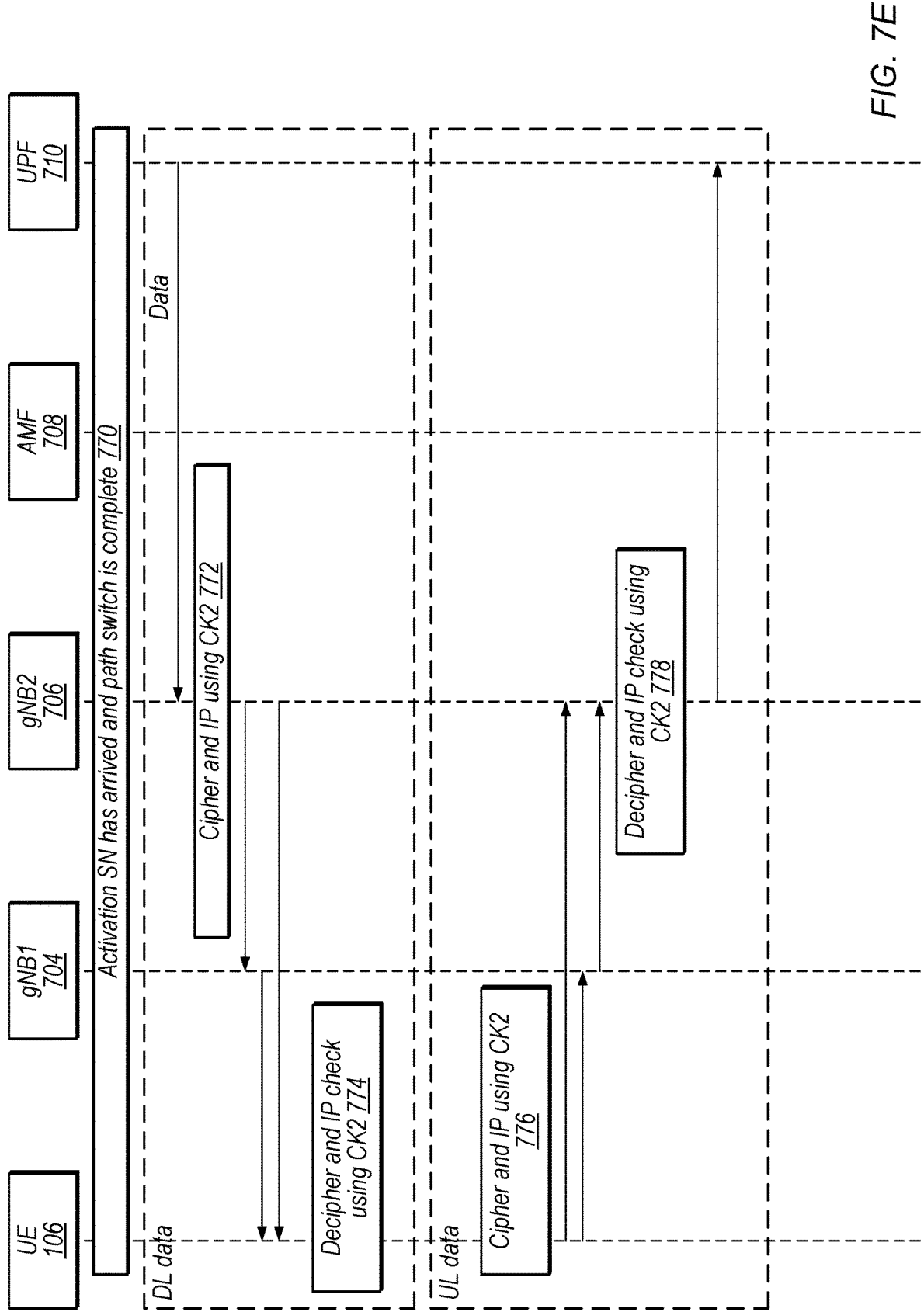

In the embodiments of FIGS. 7A-7E, the master base station determines and communicates an activation SN for DL data and the UE determines and communicates an activation SN for UL data. These SN indications are then used to determine when to switch security configurations. Note that the activation SN may or may not correspond to the end marker for the path switch. FIGS. 7C-7E provide examples of ciphering in situations before and after the activation SN and before and after completion of the path switch.

Referring to FIG. 7A, the UE begins connected to gNB 1 as a master base station and gNB2 as a secondary base station in a dual-connectivity configuration at 715. The DC configuration may be entered in anticipation of a handover or the UE may be operating in dual-connectivity for other reasons. FIG. 7A includes an upper portion illustrating DL data handling and a lower portion illustrating UL data handling, in this scenario.

For DL data (using the PDCP of gNB1), gNB1 receives DL user data from UPF 710. At 720, gNB1 uses CK1 for ciphering and its IK for integrity protection. gNB1 then sends the ciphered data to UE 106 and sends it to gNB2. gNB2 then forwards all or a portion of the data to UE 106. UE 106 deciphers both sets of received data and performs an integrity check using the security configuration of gNB1 at 722.

For UL data (using the PDCP of gNB1), UE 106 ciphers and performs integrity protection (IP) using CK1 at 724. UE 106 sends the ciphered UL user data to both gNB1 and gNB2. gNB2 forwards its data to gNB1, which deciphers and IP checks both sets of data using its security configuration at 726 and sends the UL user data to UPF 710. Thus, FIG. 7A shows a split data radio bearer using a master cell group (MCG) bearer and secondary cell group (SCG) bearer in dual connectivity configuration.

FIG. 7B continues the communications discussed in FIG. 7A. At 730, a measurement event is triggered and gNB1 responsively sends a role switch request to gNB2, which sends a response. The measurement event may be triggered by UE 106, e.g., indicating low signal levels for gNB1.

Based on the role switch, in the illustrated embodiment, gNB1 also calculates a DL activation SN. A base station may determine the activation SN based on various factors, including: latency of the path switch, DL throughput, and current network load, and/or other parameters. As discussed in further detail below, ideal performance may be achieved when the determined activation SN matches the actual path switch completion, although functionality may not be affected in other situations. The parameters discussed may allow the base station to estimate when the path switch will be complete. For example, the path switch latency may be determined based on procedures being performed between the gNB and the core network and/or past path switch intervals. The DL throughput may further inform how many SNs are likely to be exchanged during the path switch.

In the illustrated embodiment, gNB1 sends the determined DL activation SN and information that identifies the cipher key of the target gNB2 (CK2) in an RRC Connection Reconfiguration message to the UE. At 734, UE 106 stores the DL activation SN and CK2.

At 736, in the illustrated embodiment, UE 106 calculates an UL activation SN. The UE may determine the UL activation SN based on various factors, including a UL throughput estimation, for example.

Note that determining the DL and UL activation SNs may avoid an L2 reset (e.g., because the UEs and gNBs know which PDCP SN will correspond to the cipher key switch, so reset for synchronization is not needed). This may in turn reduce handover latency.

In the illustrated embodiment, UE 106 sends an RRC Connection Reconfiguration Complete message to gNB2 with the UL activation SN and the DL activation SN. At 738, gNB2 stores the UL and DL activation SNs. gNB2 then sends the UL activation SN to gNB1 in an activation SN status report and gNB1 stores the UL activation SN at 739. Note that, at this point, UE 106, gNB1, and gNB2 all have knowledge of the UL and DL activation SNs. Further, the UE has knowledge of both cipher keys for the two gNBs. Note that the disclosed techniques for communicating activation SNs are included for purposes of illustration but are not intended to limit the scope of the present disclosure. For example, in some embodiments, a base station may determine the UL activation SN. As another example, in some embodiments, UE 106 may communicate the UL activation SN to gNB1 directly.

In the illustrated embodiment, gNB2 sends a path switch request to AMF 708 which sends a user plane data request to UPF 710, which responds with a user plane data response and sends an end marker to gNB1.

FIGS. 7C, 7D, and 7E illustrate exemplary situations with different timings of activation SNs and path switch completion. FIG. 7C illustrates techniques for a situation where the activation SN has arrived and the path switch is still pending. FIG. 7D illustrates techniques for a situation where the activation SN has not arrived and the path switch is complete. FIG. 7E illustrates techniques for a situation where the activation SN has arrived and the path switch is complete. Note that greater accuracy in matching the activation SN to path switch completion may result in a greater amount of time spent in the situation of 7E.

Referring to FIG. 7C, at 740 the activation SN has arrived but the path switch is still pending. Because the activation SN has arrived, the cipher key of the gNB2 security configuration (CK2) should be used, but gNB1 is still serving as the anchor for the DC connectivity. For DL data, in the illustrated embodiment, gNB1 forwards a DL data PDU to gNB2 at 741, which ciphers and IPs both sets of data (data to be sent directly to UE 106 and data to be forwarded via gNB1) using CK2. UE 106 deciphers and IP checks data from both gNB1 and gNB2 using CK2, based on its knowledge that the activation SN has arrived.

For UL data, in the illustrated embodiment, UE 106 ciphers and IPs using CK2 at 746 and sends the data to both gNB1 and gNB2 (the data sent to the two base stations may or may not be duplicative). gNB1 forwards the data to gNB2 to decipher and IP check at 748. gNB2 deciphers and IP checks both sets of data using CK2 at 750 and 752 and sends the deciphered data back to gNB1 to send to the core network.

Referring to FIG. 7D, at 760 the activation SN has not arrived but the path switch is complete. Because the activation SN has not arrived, the cipher key of the gNB1 security configuration (CK1) should be used, but gNB2 is now serving as the anchor for DC connectivity. For DL data, in the illustrated embodiment, gNB2 forwards a DL data PDU to gNB1 at 761. At 762, gNB2 ciphers and IPs the PDU using CK1 and sends the data to UE 106 and gNB2 706 (which in turn forwards data to UE 106). At 764, UE 106 deciphers and IP checks the data using CK1, based on its knowledge that the activation SN has not yet arrived.

For UL data, in the illustrated embodiment, UE 106 ciphers and IPs using CK1 at 766 and sends the data to both gNB1 and gNB2. gNB2 forwards the data to gNB1 at 768, which deciphers and IP checks the data using CK1 at 769. gNB1 then sends the deciphered and IP checked data to gNB2 to send to the core network.

Referring to FIG. 7E, at 770 the activation SN has arrived and the path switch is complete. As shown, ciphering and IP checks may proceed according to traditional DC-connectivity in this situation, with the anchor gNB2 ciphering/deciphering and IP checking data from and for the core network.

At this point, gNB2 may send an RRCConnectionReconfiguration message to UE 106 that indicates to release dual connectivity. UE 106 may release gNB1 from the DC configuration and send an RRCConnectionReconfigurationComplete message back to gNB2. gNB2 then may inform gNB2 to release DC and receive an acknowledgement. At this point, handover from gNB1 to gNB2 may be complete.

The disclosed dual-connectivity techniques of FIGS. 7A-7E may advantageously reduce latency and/or reduce handover errors relative to traditional techniques. Further, the disclosed techniques may facilitate synchronization of the security configuration switch.

In some embodiments, instead of determining an activation SN, gNB1 may immediately activate the new cipher key CK2 and cipher all DL PDCP PDUs that are transmitted after reception of the RRCReconfigurationComplete message. In these embodiments, UE 106 may activate CK2 for new DL PDCP PDUs in response to receiving an RLC ACK indicating successful transmission of the RRCReconfigurationComplete message. For UL, in some embodiments, the UE may activate CK2 for new UL PDCP PDUs in response to an RLC ACK indicating successful transmission of the RRCReconfigurationComplete message.

In some embodiments, a method includes communicating, by a first cellular base station, with a mobile device, where the communication uses a multi-connectivity configuration with at least a second base station for the mobile device and where the first base station is a master in the multi-connectivity configuration. In some embodiments, the method further includes, in response to a role switch with the second base station, determining a downlink activation sequence number (SN) at which to switch to a security configuration of the second base station and transmitting the downlink activation SN to the mobile device. In some embodiments, the method further includes, prior to reaching the downlink activation SN, receiving forwarded downlink data from the second base station and processing the forwarded data based on a security configuration of the first base station, and in response reaching the downlink activation SN, sending downlink data to the mobile device that is processed using the security configuration of the second base station.

In some embodiments, sending downlink data to the mobile device that is processed using the security configuration of the second base station includes: after reaching the downlink activation SN and before completion of the role switch, forwarding downlink data associated with the mobile device to the second base station for processing based on the security configuration of the second base station and receiving processed data from the second base station to send to the mobile device. In some embodiments, sending downlink data to the mobile device that is processed using the security configuration of the second base station includes: after reaching the downlink activation SN and after completion of the role switch, receiving downlink data associated with the mobile device that has been processed based on the security configuration of the second base station from the second base station and sending the processed data to the mobile device.

In some embodiments, the method further includes receiving an uplink activation SN, prior to the uplink activation SN, deciphering uplink data from the mobile device using the security configuration of the first base station, and after the uplink activation SN, forwarding uplink data from the mobile device to the second base station for deciphering using the security configuration of the second base station. In some embodiments, the security configurations of the first base station and the second base station each specify a cipher key and an integrity key. In some embodiments, the determination of the downlink activation SN is performed based on one or more of: estimated path switch latency, a downlink throughput parameter, or a network load parameter.

In some embodiments, an apparatus (e.g., a baseband processor or a mobile device) includes one or more processing elements configured to: communicate with first and second base stations according to a multi-connectivity configuration, wherein the first base station acts as a master base station, send a measurement report to the first base station that initiates a role switch procedure between the first and second base stations, receive a downlink activation SN from the first base station and store the downlink activation SN, prior to the activation SN, process downlink data from the first and second base stations using a security configuration of the first base station, and after the activation SN, process downlink data from the first and second base stations using a security configuration of the second base station.

Exemplary Techniques for Automatic Detection of Security Configuration Switch

Figure 8:
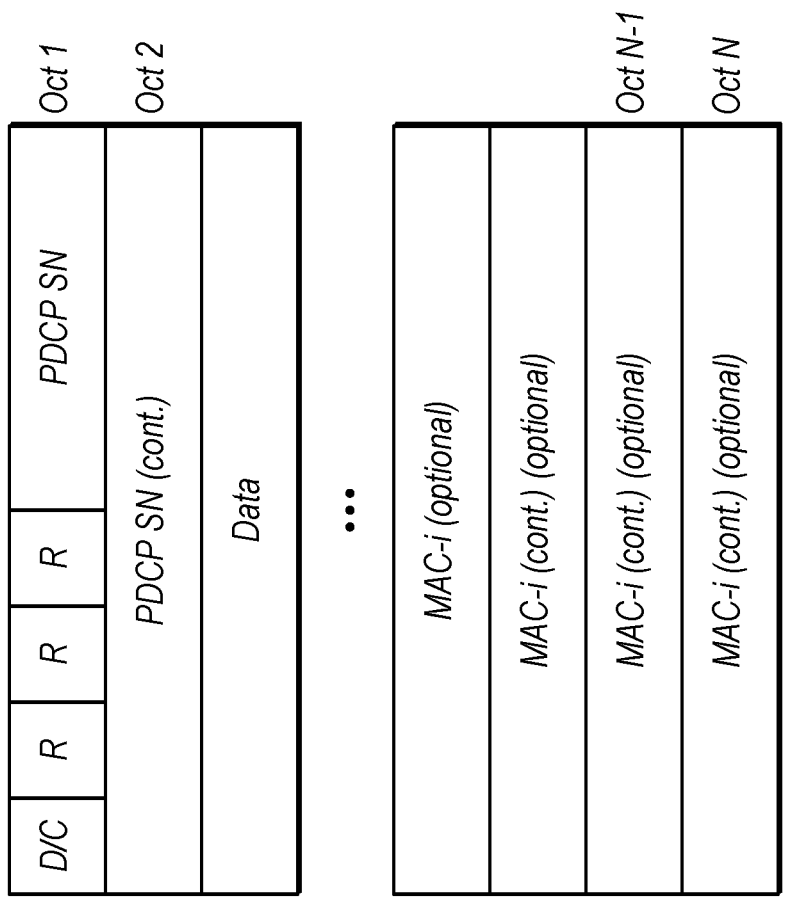
FIG. 8 is a diagram illustrating an exemplary PDCP PDU format, according to some embodiments.

FIG. 8 is a diagram illustrating an example PDCP data PDU format with a 12-bit sequence number, according to some embodiments. In some embodiments, the UE 106 and/or one or more base stations in a multi-connectivity configuration may automatically detect a security configuration switch based on a cipher failure.

In the illustrated embodiment, each row corresponds to eight bits. This format is discussed in 3GPP TS 28.323, for example, with reference to FIG. 6.2.2.2-1 and in sections 6.2.2, 6.3.3, and 6.3.4. In the illustrated example, each PDCP data PDU includes a D/C bit that indicates whether the corresponding PDCP PDU is a PDCP data PDU or a PDCP control PDU, three reserved bits, a 12-bit PDCP SN, a data payload, and an optional four-byte MAC-i payload. The MAC-i payload may be generated and verified using the integrity key for the current security configuration, when integrity protection is enabled. In some embodiments, the data part of the PDCP PDU is ciphered, but the SDAP header and MAC-i are not ciphered (if included).

In some embodiments, after an RRCReconfigurationMessage that indicates an updated key index, the RRC entity configures both key sets (e.g., CK1/IK1 from the source gNB and CK2/IK2) to the PDCP entity. In these embodiments, the PDCP entity may continue to use CK1/IK1 to decipher and cipher PDCP PDUs until the first PDCP SN for which a ciphering failure is detected. In response to detecting a ciphering failure, the PDCP entity, in some embodiments, attempts to de-cipher the PDCP PDU using CK2/IK2. If successful using CK2/IK2, the PDCP entity may consider that the security configuration switch has occurred and switch to using the target keys after that PDCP SN. The PDCP entity may release the old keys CK1/IK1 once the PDCP has received all PDUs in order (up to the switching PDU). For example, any missing PDCP PDUs may still need to be de-ciphered using CK1/IK1.

A cipher failure may be detected using one or more of various techniques. In some embodiments, when integrity protection is enabled, a cipher failure is detected when integrity protection fails (e.g., the MAC-i is not correct using IK1 to integrity check). In some embodiments, when integrity protection is not enabled, a cipher failure may be detected based on examining the format of a deciphered data payload. In some embodiments, explicit signaling may be used to determine a cipher switch in combination with other disclosed techniques. Any of the various techniques for detecting a cipher failure discussed herein may be used singly or in combination.

Therefore, in some embodiments, the integrity-based cipher detection failure techniques of FIGS. 8-10B may be used if integrity protection is enabled on one or more (or all) DRBs and SRB entities while in DC-based mobility configuration or if integrity protection is enabled on one or more (or all) configured DRBs, for example.

FIG. 9 is a flow diagram illustrating a method for exemplary integrity-based switch detection with alternative techniques when integrity is disabled, according to some embodiments. In the illustrated embodiment, at 910 after a PDCP data PDU is received the PDCP entity determines whether integrity is enabled on this DRB/SRB. If not, at 915 an alternative technique is used to detect a cipher failure. One example of an alternative technique is analyzing the de-ciphered data to check if it matches a known format (e.g., a typical IPv4 or IPv6 header or some other typical field in the transport protocol being used on the link). Another alternative technique may include inserting a new bit, field, or header field, that is not ciphered which explicitly indicates a ciphering key switch.

At 920, in the illustrated embodiment, the key index is set to 1 (e.g., corresponding to CK1/IK1). At 925, in the illustrated embodiment, the PDCP entity deciphers the PDCP PDU using CK[index]. For the first iteration, this is CK[1], but for subsequent iterations keys of other base stations in multi-connectivity configuration will be used, e.g., based on increments at 950.

At 930, in the illustrated embodiment, the PDCP entity calculates the MAC-i for the PDCP PDU using IK[index]. At 935, if integrity passes (e.g., the calculated MAC-i matches the received MAC-i), the index is used for the current key (e.g., CK1/IK1 if an integrity pass in the first iteration or CKn/IKn in subsequent iterations). If integrity does not pass at 935, the index is incremented at 950 and at 940 the PDCP entity determines whether the incremented index is a valid index for the multi-connectivity set. If not, an actual ciphering error is detected at 945. If so, another iteration is performed to determine if a security configuration switch has occurred.

FIGS. 10A and 10B are communications diagrams illustrating exemplary cipher-failure-based security configuration switching, according to some embodiments. In the illustrated embodiment, the core network includes next generation core (NGC) 1002 and user plane gateway (UP-GW) 1004. At 1010, in the illustrated embodiment, UE 106 is connected to gNB1 as the master and gNB2 as the secondary in a DC configuration. In response to a measurement event 1012, gNB1 initiates a role switch and sends a request to gNB2. In the illustrated embodiment, the RRCReconfigurationRequest includes the CK of the target gNB2 (CK2). The UE stores the new CK at 1014 and then sends an RRCReconfigurationComplete message using the new CK/IK. After the path switch, DL user data is ciphered using CK2 and arrives at UE 106. At 1016, in the illustrated embodiment, UE 106 detects a decipher failure using CK1 (e.g., using the method of FIG. 9). At 1018, UE 106 tries the new CK and detects a decipher success, then switches to CK2/IK2 for UL and DL DRBs.

As shown in FIG. 10B, for example, UE 106 uses CK2 to encipher UL user data to both gNBs and gNB2 deciphers the UL data using CK2 at 1020. As discussed above, gNB1 may be subsequently released.

In some embodiments, uplink SRB PCDCP PDU switch over to using the new target CK/IK keys on reception of keys via an RRC Reconfiguration message (as RRC entities end in target gNB). In some embodiments, the network is prohibited from sending any further SRB data after the RRC Reconfiguration message until it receives the RRC Reconfiguration Complete message from the UE RRC entity. In some embodiments, this RRC Reconfiguration Complete message is itself enciphered using the target CK/IK key.

In some embodiments, uplink DRB PDCP PDUs switch over on a per DRB basis using one of the two example techniques. In a first technique, the network may configure a time interval T after HARQ Ack for the RRC Reconfiguration Complete message that contained the key is received at the MAC Layer. In these embodiments, the PDCP entity is configured to switch over to the new keyset once T1 expires.

In a second technique, the PDCP transmit entity may switch over to the new keyset once it receives the first DL PDCP PDU that is detected to be using the new cipher/integrity key. In case of UL only traffic, the device RRC entity may provide an activation SN to indicate the latest possible PDCP SN for UL PDCP to switch over the key set. This may imply that the device is free to switch over the PDCP key in UL sooner, e.g., based on DL Ciphering key switch detection.

In some embodiments, these techniques may advantageously allow synchronization of key switchover between the mobile device and base stations, reduce handover latency, and/or reduce handover errors.

In some embodiments, an apparatus (e.g., a baseband processor or a mobile device) includes one or more processing elements configured to: receive a protocol data unit from a first base station, where the first base station is included in a set of base stations with which the mobile device is connected according to a multi-connectivity configuration and wherein the protocol data unit is received subsequent to an RRC connection reconfiguration to handover from the first base station to a second base station in the set of base stations, attempt to decipher the protocol data unit using a cipher key of the first base station, in response to failure to decipher the protocol data unit, attempt to decipher the protocol data unit using a cipher key of the second base station, and in response to successful deciphering of the protocol data unit using the cipher key of the second base station, switch to a security configuration of the second base station for subsequent multi-connectivity communications with the set of base stations.

In some embodiments, the failure to decipher the protocol data unit is based on detecting an integrity failure for the PDU. In some embodiments, the failure to decipher the protocol data unit is based on failure to detect an expected format in deciphered data.

Exemplary Security Techniques for Explicitly-Signaled Security Configuration Switch In some embodiments, an explicit signal (e.g., a bit in the PDCP header) may be used to indicate a key switch from original to target keys during DC-based handover. For example, one of the reserved (R) bits shown in the PDU header of FIG. 8 may be used for such a signal. This header may be sent in plain text, however, which may be vulnerable to security attacks (e.g., to force the UE to switch keys and become out of synchronization with the network). This may lead to denial of service by corrupting DL data, for example. In some embodiments, disclosed techniques protect the first PDU that indicates a key switchover. Similar techniques may be used for various explicit key switch signaling locations, such as RRC signaling, a new PDCP control PDU, or a new MAC control element.

In some embodiments, if integrity is configured, in response to the first in-sequence PDCP PDU that explicitly indicates a switch, the receiving PDCP entity is configured to perform de-ciphering with the new key (e.g., CK2) and calculate the MAC-i using the new key IK2. On an integrity failure, the PDCP entity is configured to discard the PDCP PDU and disregard the key switch indicator. This may detect incorrect toggling of the switch signal and avoid incorrect switches to new keys. In some embodiments, if t-reordering expires and RX_DELIV>=PDCP PDU SN (key switch indicator toggled) and integrity succeeds, the keyset is considered switched for that DRB.

In some embodiments, if integrity is not configured, in response to the first in-sequence PDCP PDU that explicitly indicates a switch, the receiving PDCP entity is configured to perform de-ciphering with the new key CK2. The PDCP PDU may analyze the data payload (e.g., to detect expected formatting) and discard the PDU if a cipher mismatch is detected. In some embodiments, the receiving entity may be configured to initiate a radio link failure in response to detecting a cipher mismatch.

Therefore, in some embodiments, a method includes receiving, in a plain text portion of a protocol data unit, information that indicates a switch from a security configuration of a first base station to a security configuration of a second base station, determining whether a deciphering operations was successful for the PDU, and refraining from switching to the security configuration of the second base station in response to detecting a deciphering failure. In some embodiments, the method includes initiating a radio link failure in response to detecting a cipher mismatch.

Exemplary Enhanced MBB-Based Handover with Retaining Source gNB after Path Switch In some embodiments, using enhanced make before break (MBB) techniques, the network is configured to retain the source gNB after the path switch is complete. This technique may not require key switch synchronization and may advantageously provide diversity after the handover is complete to reduce handover failures.

FIGS. 11A-11C are communication diagrams illustrating exemplary techniques for retaining a source gNB after a path switch, according to some embodiments. Referring to FIG. 11A, at 1022 in the illustrated embodiment, the gNB1 is the master and gNB2 is in the handover set. The upper portion of FIG. 11A shows the procedure for DL data while the lower portion shows the procedure for UL data. gNB1 receives DL user data and sends it to gNB2. Each gNB separately ciphers its data (which may or may not be duplicative) at 1024 and 1026. UE 106 separately deciphers the communications from the gNB using their respective keys. Therefore, UE receives DL PDUs on two RLC legs in the illustrated example.

For UL data, in the illustrated embodiment, UE 106 separately ciphers UL data for different gNBs using their respective keys and gNB sends deciphered UL user data to the core network.

At the end of FIG. 11A, UE 106 sends a change request to gNB2. This may be based on low measurement thresholds for gNB1 or gNB2 meeting a threshold measurement relative to gNB1, for example. Referring to FIG. 11B, the network performs a path switch procedure at 1040. gNB2 then sends a gNB change response to UE 106 with the split DRB status and an indication that gNB1 has not been released. This indication may provide advantages over conventional techniques where the source gNB was dropped after a successful make before break handover.

DL and UL data are handled in FIG. 11B similarly to FIG. 11A, with separate keys used for separate base stations, with the difference that gNB2 is the anchor in FIG. 11B.

Referring to FIG. 11C, a procedure is shown for releasing the gNB1 in response to a measurement report at 1062, 1064, and 1066. The measurement report may be sent in response to conditions for gNB1 falling below a threshold. After the release of gNB1, UE 106 may communicate with the core network via gNB2 without dual-connectivity. Note that, in the situation where gNB2 indicates that gNB1 should be released in the gNB change response of FIG. 11B, the UE 106 may release the gNB1 leg immediately in response to the gNB change response.

In some embodiments, a method includes communicating with a mobile device using a first base station and first security configuration while the mobile device is also in communication with a second base station using a second security configuration during a handover procedure. In some embodiments, the method includes remaining connected to the first base station after a role switch in which the second base station becomes the anchor base station for communications with the mobile device.

As used herein, the term "module" refers to circuitry configured to perform specified operations or to physical non-transitory computer readable media that store information (e.g., program instructions) that instructs other circuitry (e.g., a processor) to perform specified operations. Thus, modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
communicating, by a first cellular node, with a mobile device, using a first cipher key of the first node;
transmitting an indication of a change procedure to handover from the first node as a master node to a second cellular node as a master node for the mobile device;
subsequent to completion of the change procedure and establishment of the second cellular node as the master node for the mobile device, both the first node and the second node communicating with the mobile device, using the first cipher key for downlink communications of the first node and a second cipher key of the second node for downlink communications of the second node; and
transmitting a release indication from the second node that indicates for the mobile device to release communication resources for the first node and continue communication with the second node.

2. The method of claim 1, further comprising:
transmitting signaling from the second node that indicates to the mobile device remain connected to the first node subsequent to completion of the change procedure.

3. The method of claim 2, wherein the signaling is included in a change response from the second node.

4. The method of claim 1, wherein the transmitting the release indication is performed in response to a measurement report from the mobile device.

5. The method of claim 1, further comprising:
at least one of the first and second nodes forwarding uplink data from the mobile device to the other one of the first and second nodes.

6. An apparatus, comprising:
one or more processing elements configured to:
communicate with a first cellular node using a first cipher key of the first node;
receive an indication of a change procedure to handover from the first node as a master node to a second cellular node as a master node for the apparatus;
subsequent to completion of the change procedure and establishment of the second cellular node as the master node for the apparatus, communicate with both the first and second nodes, using the first cipher key for downlink communications of the first node and a second cipher key of the second node for downlink communications of the second node; and
in response to a release indication from the second node, release communication resources for the first node and continue communication with the second node.

7. The apparatus of claim 6, wherein the one or more processing elements are further configured to:
received signaling from the second node that indicates to remain connected to the first node subsequent to completion of the change procedure.

8. The apparatus of claim 7, wherein the signaling is included in a change response from the second node.

9. The apparatus of claim 6, wherein the one or more processing elements are further configured to:
send a measurement report to the second node to trigger the release indication from the second node.

10. The apparatus of claim 9, wherein the measurement report includes measurement information for both the first node and the second node.

11. The apparatus of claim 6, wherein at least one of the first and second nodes forwards uplink data from the apparatus to the other one of the first and second nodes.

12. The apparatus of claim 6, wherein the downlink communications with both the first and second nodes use different integrity keys.

13. The apparatus of claim 6, wherein the downlink communications with both the first and second nodes use different security configurations.

14. The apparatus of claim 6, wherein the apparatus is a mobile cellular device that further includes:
one or more antennas; and
one or more radios coupled to the one or more processing elements and configured to communicate via the one or more antennas.

15. A non-transitory computer-readable medium having instructions stored thereon that are executable by a computing device to perform operations comprising:
communicating with a first cellular node using a first cipher key of the first node;

receiving an indication of a change procedure to handover from the first node to as a master node to a second cellular node as a master node for the computing device;

subsequent to completion of the change procedure and establishment of the second cellular node as the master node for the computing device, communicating with both the first and second nodes, using the first cipher key for downlink communications with the first node and a second cipher key of the second node for downlink communications with the second node; and in response to a release indication from the second node, releasing communication resources for the first node and continue communication with the second node.

16. The non-transitory computer-readable medium of claim 15, wherein the operations further comprise:
receiving signaling from the second node that indicates to remain connected to the first node subsequent to completion of the change procedure, wherein the signaling is included in a change response from the second node.

17. The non-transitory computer-readable medium of claim 15, wherein the operations further comprise:
sending a measurement report to the second node to trigger the release indication from the second node.

18. The non-transitory computer-readable medium of claim 15, wherein at least one of the first and second nodes forwards uplink data from the computing device to the other one of the first and second nodes.

19. The non-transitory computer-readable medium of claim 15, wherein the downlink communications with both the first and second nodes use different integrity keys.

20. The non-transitory computer-readable medium of claim 15, wherein the downlink communications with both the first and second nodes use different security configurations.

21. A system, comprising:
one or more processors corresponding to a first cellular node and configured to:
communicate with a mobile device, using a first cipher key of the first cellular node;
send, to a second cellular node, an indication of a change procedure to handover from the first node as a master node to the second cellular node as a master node for the mobile device; and
subsequent to completion of the change procedure and establishment of the second cellular node as the master node for the mobile device, communicate with the mobile device using the first cipher key for downlink communications of the first node, during a time interval in which the second node communicates with the mobile device using a second cipher key for downlink communications of the second node.

22. The system of claim 21, further comprising one or more processors corresponding to the second node that are configured to communicate with the mobile device using the second cipher key during the time interval.

23. The system of claim 22, wherein the one or more processors corresponding to the second node are further configured to indicate to transmit signaling that indicates to the mobile device remain connected to the first node subsequent to completion of the change procedure.

24. The system of claim 23, wherein the signaling is included in a change response.

25. The system of claim 22, wherein the one or more processors corresponding to the second node are further configured to transmit a release indication that indicates for the mobile device to release communication resources for the first node and continue communication with the second node.

26. The system of claim 21, wherein the one or more processors corresponding to the first node are further configured to forward uplink data from the mobile device to the second node.

* * * * *